US011561965B2

(12) United States Patent
Mahadik

(10) Patent No.: US 11,561,965 B2
(45) Date of Patent: Jan. 24, 2023

(54) DATA RETRIEVAL VIA INCREMENTAL UPDATES TO GRAPH DATA STRUCTURES

(71) Applicant: Adobe Inc., San Jose, CA (US)

(72) Inventor: Kanak Mahadik, San Jose, CA (US)

(73) Assignee: Adobe Inc., San Jose, CA (US)

( * ) Notice: Subject to any disclaimer, the term of this patent is extended or adjusted under 35 U.S.C. 154(b) by 144 days.

(21) Appl. No.: 16/943,322

(22) Filed: Jul. 30, 2020

(65) Prior Publication Data

US 2022/0035794 A1     Feb. 3, 2022

(51) Int. Cl.
*G06F 16/23*     (2019.01)
*G06F 16/903*    (2019.01)
*G06F 16/901*    (2019.01)

(52) U.S. Cl.
CPC ...... *G06F 16/2379* (2019.01); *G06F 16/2358* (2019.01); *G06F 16/9024* (2019.01); *G06F 16/90335* (2019.01)

(58) Field of Classification Search
CPC ........... G06F 16/2379; G06F 16/90335; G06F 16/2358; G06F 16/9024
See application file for complete search history.

(56) References Cited

U.S. PATENT DOCUMENTS

| | | | | |
|---|---|---|---|---|
| 2016/0125471 A1* | 5/2016 | Hsu | ..................... | G06Q 30/0269 705/14.66 |
| 2018/0330008 A1* | 11/2018 | Fan | ..................... | G06F 16/90335 |
| 2018/0351835 A1* | 12/2018 | Williams | ........... | G06Q 30/0277 |
| 2021/0081468 A1* | 3/2021 | Raman | ............... | G06Q 30/0239 |

OTHER PUBLICATIONS

Profile Merge Rules Options Defined, Adobe, Document retrieved from: https://experienceleague.adobe.com/docs/audience-manager/user-guide/features/profile-merge-rules/merge-rule-definitions.html?lang=en#overview, Jun. 25, 2020, 6 pages.
Profile Merge Rules Overview, Adobe, Document retrieved from: https://experienceleague.adobe.com/docs/audience-manager/user-guide/features/profile-merge-rules/merge-rules-overview.html?lang=en#data-collection-targeting, Jun. 25, 2020, 3 pages.
Updating RDDs with IndexedRDD, Document retrieved from: http://ampcamp.berkeley.edu/6/exercises/indexedrdd.html, Accessed from Internet on: Feb. 3, 2021, 3 pages.
Zaharia et al., Apache Spark: A Unified Engine for Big Data Processing, Communications of the ACM, vol. 59, No. 11, Nov. 2016, 10 pages.

* cited by examiner

*Primary Examiner* — Tamara T Kyle
*Assistant Examiner* — Lahcen Ennaji
(74) *Attorney, Agent, or Firm* — Kilpatrick Townsend & Stockton LLP

(57) ABSTRACT

Certain embodiments involve tracking incremental updates to graph data structures and thereby facilitating efficient data retrieval. For instance, a computing system services a first query for one or more segments of computing devices, online entities, or both. The computing system services the first query by searching of a set of nodes from a graph data structure. The computing system receives a second query after the graph data structure has been modified. The computing system identifies, from a change list for tracking changes to the graph data structure, a subset of the nodes impacted by the modification to the graph data structure. The computing system services the second query by searching the subset of impacted nodes in the graph data structure.

20 Claims, 9 Drawing Sheets

DATA RETRIEVAL VIA INCREMENTAL UPDATES TO GRAPH DATA STRUCTURES

TECHNICAL FIELD

This disclosure relates generally to data structures that control the extraction and loading of data in computerized data storage and processing systems. More specifically, but not by way of limitation, this disclosure relates to tracking incremental updates to graph data structures and thereby facilitating efficient data retrieval.

BACKGROUND

In a computerized data processing system, large datasets are stored using logical relationship among data elements designed that support certain data manipulation functions. For instance, a graph data structure is used to represent relationships among data objects, and are used by analytical tools that service queries regarded groups of data objects. A graph data structure includes nodes, which can represent different devices or online entities, edges that identify mappings between different devices and online entities, as well as traits associated with the devices or entities.

In some cases, querying a graph data structure can involve generating lookup tables that associate traits with groups of related vertices. If the graph data structure is updated, the lookup tables must also be updated to ensure that queries are serviced accurately. But updating such tables involves extensive batch-processing operation that process all nodes and edges of the graph data structure. This batch processing can require extensive computing resources that introduce latency when servicing queries, thereby decreasing the responsiveness of software that relies on the graph data structure.

SUMMARY

Certain embodiments involve tracking incremental updates to graph data structures and thereby facilitating efficient data retrieval. In an illustrative example, a data management system services a first query having a set of query parameter values identifying traits of a segment of computing devices, online entities, or both. The data management system services the first query by searching of a set of nodes from a graph data structure. The data management system receives a second query after the graph data structure has been modified. The data management system identifies, from a change list for tracking changes to the graph data structure, a subset of the nodes impacted by the modification to the graph data structure. The data management system services the second query by searching the subset of impacted nodes in the graph data structure.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
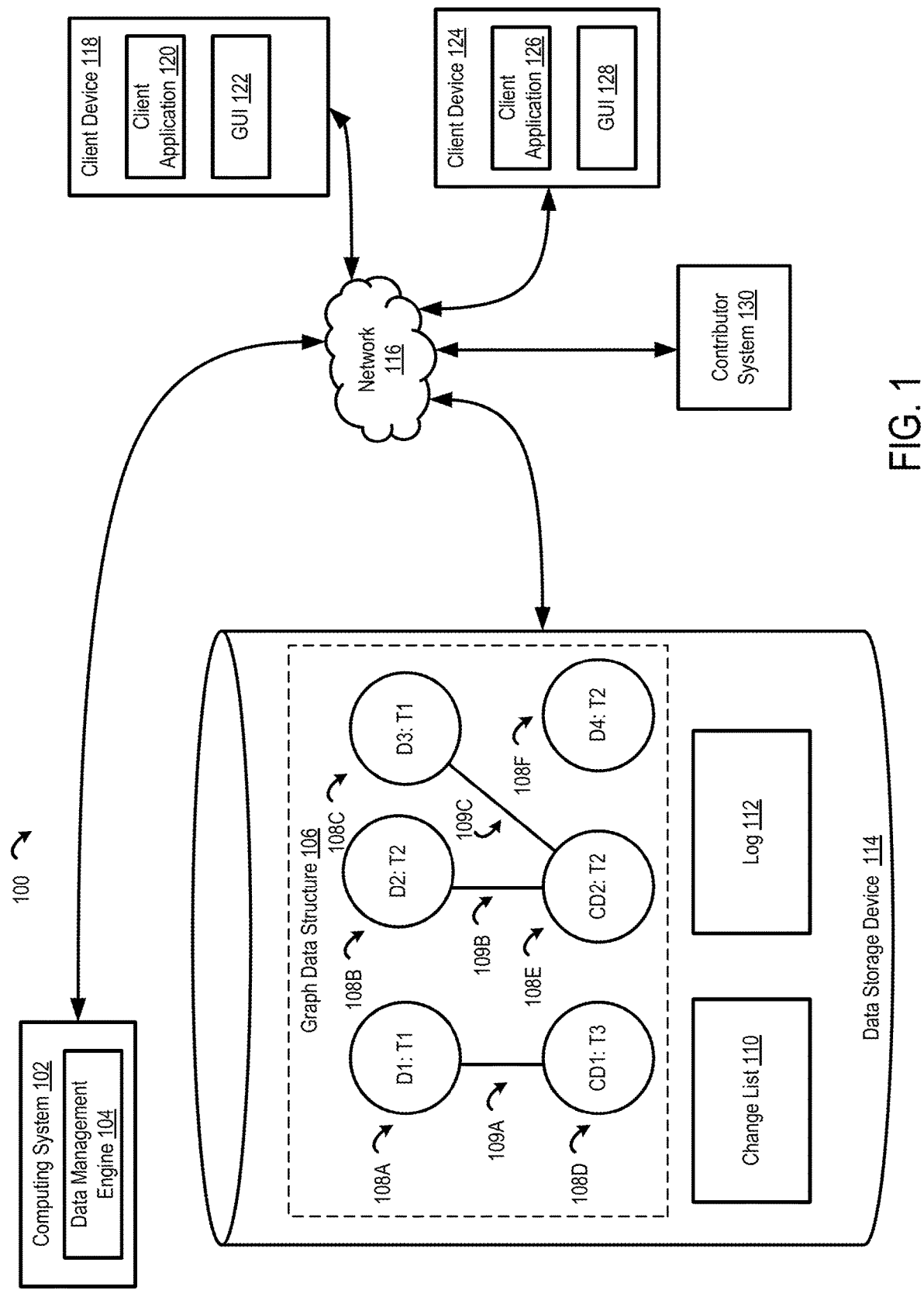
FIG. 1 depicts an example of a computing environment for servicing queries by tracking incremental updates to graph data structures, according to certain embodiments described in this disclosure.

Certain embodiments involve tracking incremental updates to graph data structures and thereby facilitating efficient data retrieval. For instance, a graph data structure is implemented using a set of key-value indices, where change lists track how changes to these key-value indices impacts nodes of the graph data structure. Software applications that use the graph data structure service queries by searching these key-value indices in a manner that is constrained by the change list. By doing so, data can be efficiently retrieved from an updated graph data structure without requiring the creation of lookup tables through computationally expensive batch processing.

The following non-limiting example is provided to introduce certain embodiments. In this example, a data management system, such as a cloud-based service, provides various client devices with access to data regarding devices for accessing interactive computing environments, online entities that are authenticated by or otherwise used for interactions within these computing environments, and traits of the devices and entities (e.g., network locations, interaction history, device types, etc.). The data management system services queries for this data using a combination of a graph data structure, a log, and one or more change lists. This combination of the graph data structure, the log, and the change lists facilitates efficient retrieval of data by the data management system.

Continuing with this example, the data management system uses the change list to reduce the amount of processing required with respect to the graph data structure when multiple devices submit queries having the same query parameter values. In one example, the data management services a first query having a set of query parameter values. The query parameter values specify traits of interest with respect to the computing devices, the online entities, or both. For instance, the query could request a segment of computing devices having a certain device type and associated with a certain type of activity by online entities within a computing environment. The data management system services the first query by applying a segment qualification operation to a set of nodes from a graph data structure, which identifies a first segment set that includes one or more segments matching the query parameter values. The data management system responds to the first query by identifying the first segment set. The data management system also stores, in the log, data identifying the first segment set generated by the segment qualification operation.

The data management system uses the change list and the log to efficiently service subsequent queries. For instance, after the first query has been serviced, the data management system modifies the graph data structure, such as by adding or removing traits to nodes or by adding or removing edges between nodes that indicate relationships among computing devices and online entities. The data management system updates the change list to identify the nodes that are impacted by the modification (e.g., the nodes to which an edge was added, the nodes for which traits were modified, etc.). In this example, the data management system then receives a second query having the same set of query parameter values as the first query.

To service this query, the data management system identifies, from the change list, a subset of nodes that have been impacted by one or more modifications to the graph data structure. If the change list indicates that none of the nodes involved in the first segment set were impacted by modifications to the graph data structure, the data management system retrieves the first segment set from the log and responds to the query by identifying the first segment set. But if the change list identifies one or more nodes of the first segment set that were impacted by the modification, the data management system updates the first segment based on the impacted subset of nodes, thereby generating a second segment set. The data management system then responds to the query by identifying the second segment.

As described herein, certain embodiments provide improvements to computing systems used for graph analytics. For instance, conventional techniques for servicing queries to updated graph data structure rely on computationally expensive batch-processing to generate simplified lookup tables. By contrast, embodiments described herein implement a graph data structure for computerized data processing systems using a set of searchable indices coupled with one or more change lists. The change lists, by tracking which nodes of the graph data structure have been updated, the change lists allow the computerized data processing system to target specific portions of the indices implementing the graph data structure and thereby identify incremental updates to previously returned queries. Thus, certain embodiments facilitate efficient data retrieval from the graph data structure than is available with conventional techniques.

Example of an Operating Environment for Servicing Queries by Tracking Incremental Updates to Graph Data Structures Referring now to the drawings, FIG. 1 depicts an example of a computing environment 100 for servicing queries by tracking incremental updates to graph data structures, according to certain embodiments of this disclosure. In the example depicted in FIG. 1, various client devices 118, 124 access a computing system 102 via a data network 116. The computing system 102 includes processing hardware for executing program code, such as a data management engine 104. In various embodiments, the computing system 102 includes one or more processing devices, e.g., one or more servers, one or more platforms with corresponding application programming interfaces, cloud infrastructure, and the like.

In example of FIG. 1, the computing environment 100 also includes a graph data structure 106. The graph data structure 106 is used to store data regarding traits of computing devices that access interactive computing environments, traits of online entities that are authenticated interactive computing environments, or both. The graph data structure 106 is stored on one or more suitable data storage devices 114 (e.g., a memory device, network-attached storage, a storage area network, etc.) that are communicatively coupled to the computing system 102. The graph data structure 106 includes nodes representing computing devices and online entities. For instance, in FIG. 1, the graph data structure 106 includes nodes 108a-d that represent computing devices and that are labeled "D1," "D2," "D3," and "D4." The example of the graph data structure 106 depicted in FIG. 1 also includes nodes 108e and 108f that represent online entities or cross-device identifiers for the online entities, where the nodes are labeled "CD1" and "CD2." Each node also has one or traits, labeled as "T1," "T2," and "T3" in FIG. 1. The graph data structure 106 also includes edges 109a-c that identify relationships among the nodes 108e-f, such as certain computing devices that are used to access an interactive computing environment being associated with cross-device identifiers (i.e., online entities) that have accessed those environments. For instance, an edge 109a between the node D1 and the node CD1 could indicate that a cross-device identifier CD1 was used to access an interactive computing environment from the computing device D1.

The graph data structure 106 could be implemented using a set of key-value indices. For instance, the example of a graph data structure 106 depicted in FIG. 1 could be implemented using the three indices in Tables 1-3 below. In Table 1, the first key-value index identifies the nodes and traits of the nodes. The keys of the first key-value index identify the online entities and the computing devices. The values of the first key-value index identify traits of the online entities and traits of the computing devices.

TABLE 1

| ID | Traits |
|---|---|
| D1 | T1 |
| D2 | T2 |
| D3 | T1 |
| D4 | T2 |
| CD1 | T3 |
| CD2 | T2 |

In Table 2, a second key-value index indicates edges between nodes of the graph data structure. For instance, keys of the second key-value index identify the computing devices. Values of the second key-value index identify sets of the online entities linked to the computing devices.

TABLE 2

| Device ID | Cross-Device ID |
|---|---|
| D1 | CD1 |
| D2 | CD2 |
| D3 | CD2 |

In Table 3, a third key-value index indicates edges between nodes of the graph data structure. For instance, keys of the third key-value index identify the online entities. Values of the third key-value index identify sets of the computing devices linked to the online entities.

TABLE 3

| Cross-Device ID | Device ID |
|---|---|
| CD1 | D1 |
| CD2 | D2, D3 |

In some embodiments, servicing a query involves searching the graph data structure 106 for segments that include certain traits and responding with a message that identifies a segment set having one or more of segments with the queried traits. Examples of a segment includes a set of devices, a set of online entities, or a set of related devices and online entities. In one example, the data management engine 104 identifies a given segment that includes a computing device (e.g., a device identifier) as well as the online entities (e.g., the cross-device identifiers) that are linked to the computing device. For instance, the data management engine 104 could identify keys D1, D2, and D3 from Table 2 and thereby determine segments from the corresponding values in Table 2 (i.e., segments {D1, CD1}, {D2, CD2}, and {D3, CD2}). In another example, the data management engine 104 identifies a given segment that includes an online entity (e.g., a cross-device identifier) as well as the computing devices (e.g., the device identifiers) that are linked to the online entity. For instance, the data management engine 104 could identify keys CD1 and CD2 from Table 3 and thereby determine segments from the corresponding values in Table 3 (i.e., segments {CD1, D2}, {CD2, D2, D3}).

In a simplified example involving Tables 1-3, the data management engine 104 services a query using the graph data structure 106 by performing a segment qualification operation that identifies segments from Tables 2 or 3 and searching Table 1 for nodes having the traits specified by the query. The data management engine 104 returns, as the segment set (also referred to as the qualified segments), the subset of the identified segments having the traits. For instance, if a merge rule used to identify segments indicates that each segment is defined as a most recently authenticated cross-device identifier and any linked device identifiers, then the data management engine 104 determines, from the merge rule, that Table 3 should be used to service the query. The data management engine 104 identifies each segment by searching Table 3 for each cross-device identifier matching the criteria in the merge rule and identifies one or more device identifiers linked to that cross-device identifier. To identify the traits for a given segment, the data management engine 104 searches Table 1 for the traits associated with the cross-device identifier in the segment and the traits for any device identifiers linked to that cross-device identifier.

In some embodiments, the computing environment 100 includes one or more contributor systems 130. A contributor system 130 transmits data to the computing system 102 that is used to update the graph data structure 106. For instance, a contributor system 130 could include one or more post systems that provide an interactive computing environment accessible to user devices. Examples of the interactive computing environment include a mobile application specific to a particular type of user device, a web-based application accessible via mobile device, etc. In some aspects, the executable instructions for the interactive computing environment can include instructions that provide one or more graphical interfaces. The graphical interfaces are used by a user device to access various functions of the interactive computing environment. For instance, the interactive computing environment could authenticate an online entity, provide access to one or more computer-implemented functions (e.g., gaming, content creation, commerce, etc.), and execute one or more functions responsive to input received from the online entity. The contributor system 130 collects data such as identifiers of the computing devices that access the interactive computing environment, cross-device identifiers of online entities that access the interactive computing environment, traits of the computing devices (e.g., device type, operating system, IP address, physical location, interaction history, etc.), traits of the online entities (e.g., demographics, physical location, online usage history, etc.), or some combination thereof. A contributor system 130 transmits this collected data to the computing system 102. The data management engine 104 updates the graph data structure 106 to incorporate the data received from the contributor system 130.

Efficiently servicing queries for data stored in the graph data structure 106 can present difficulties due to the volume of data in the graph data structure 106, the frequency of updates received from one or more contributor systems 130, or both. To address these difficulties, the data management engine 104 services queries using a combination of the graph data structure 106 and one or more change lists 110. A change list 110 identifies changes to nodes of the graph data structure 106, such as the addition or removal of edges. The combination of the graph data structure 106 and the change list 110 facilitate the efficient retrieval of relevant data in response to such queries.

In an illustrative example, the data management engine 104 receives, from a client device 118, a first query that includes a set of query parameter values. The client device 118 receives the query parameters via a graphical user interface ("GUI") 122 of a client application 120, such as a web browser or other application for accessing the data management engine 104. The set of query parameter values identify, for instance, a desired segment of data stored in the graph data structure 106. An example of a segment is a set of computing devices, a set of online entities, or both that have a specified set of traits. The data management engine 104 services the first query by performing a segment qualification operation using one or more key-value indices that implement the graph data structure 106. An example of a segment qualification operation is described below with respect to FIG. 3. In response to the first query, the data management engine 104 transmits, via the data network 116, a response to the client device 118. The transmitted response identifies the segment of online entities, computing devices, or both that match the set of query parameter values. The data management engine 104 also stores, in the log 112, data identifying the set of query parameter values received from the client device 118 and the specified segment that was identified in the response transmitted to the client device 118.

Continuing with this example, subsequent to the data management engine 104 servicing the first query, the graph data structure 106 changes. For instance, the data management engine 104 receives new or updated data from one or more of the contributor systems 130. The data from one or more of the contributor systems 130 identifies traits detected with respect to computing devices (e.g., detecting a certain computing device being used at a particular location), traits detected with respect to online entities (e.g., detecting a login by an online entity that originates from a certain IP address), associations among computing devices and online entities (e.g., a certain online entity using a certain computing device to log into an online service), or some combination thereof. The data management engine 104 updates the graph data structure 106 to incorporate these changes. For instance, the data management engine 104 could modify a key-value index to reflect changes in associations among devices and entities, modify a key-value index to reflect changes in traits associated with devices and entities, or some combination thereof. The data management engine 104 also updates the change list 110 to identify modifications to the graph data structure 106. For instance, the change list 110, as modified, indicates which nodes were added or modified during a particular time period.

In this illustrative example, the data management engine 104 uses the change list 110 to service a second query for the same set of query parameters more efficiently than the first query was serviced. For instance, the data management engine 104 receives the second query, from a client device 124. The second query that includes the same set of query parameter values, which the client device 124 has received via a GUI 128 of a client application 126, such as a web browser or other application for accessing the data management engine 104.

The data management engine 104 services the second query using a combination of the log 112, the change list 110, and the graph data structure 106. To do so, the data management engine 104 matches the set of query parameters in the second query to the logged query parameters in the log 112. The data management engine 104 retrieves the specified segment, which was identified in the response to the logged query parameters. The data management engine 104 also searches the change list 110 for changes to the graph data structure 106 that occurred after the specified segment was added to the log 112 (e.g., entries in the change list 110 with timestamps subsequent to a timestamp of the segment in the log 112). In the example above involving Tables 1-3, the data management engine 104 selects a change list that identifies node types (e.g., device identifiers or cross-device identifiers) indicated by a merge rule used to identify segments. For instance, if the merge rule indicates that each segment is defined as a most recently authenticated cross-device identifier and any linked device identifiers, then the data management engine 104 selects a change list identifying changes to the graph data structure 106 that impact nodes for cross-device identifiers. If the data management engine 104 identifies, from the change list 110, nodes of the graph data structure 106 that are represented in the retrieved segment and that were modified after the first query, the data management engine 104 performs a segment qualification operation that is limited to those identified nodes. For instance, in the example above involving Tables 1-3, the segment qualification operation involves searching Table 3 for each cross-device identifier that matches the criteria in the merge rule and that is identified in the selected change list.

Continuing with this example, the data management engine 104 updates the segment retrieved from the log 112 to reflect the results of the segment qualification operation on the those identified nodes. In response to the second query, the data management engine 104 transmits, via the data network 116, a response to the client device 124. The transmitted response identifies the updated segment of online entities, computing devices, or both that match the set of query parameter values. The data management engine 104 also stores, in the log 112, data identifying the set of query parameter values received from the client device 124 and the specified segment that was identified in the response transmitted to the client device 124.

The example above is provided for illustrative purposes. But other implementations and use cases are possible. For instance, the computing system 102 could receive multiple queries from the same client device at different times, where queries that include the same query parameters are serviced using the log 112, the change list 110, and the graph data structure 106 as discussed above.

As noted above, the computing environment 100 includes, in some embodiments, client devices 118, 124. Examples of client devices 118, 124 include, but are not limited to, a personal computer, a laptop, a tablet, a desktop, a server, a mobile device, a smartphone, a processing unit, any combination of these devices, or any other suitable device having one or more processors. Users of client devices 118, 124 use various products, applications, or services supported by the computing system 102 via the data network 116. The client devices 118, 124 includes one or more devices that execute program code providing one or more modules, engines, applications, etc. for providing one or more digital experiences to the user. Examples of this program code include software components depicted in FIG. 1, such as the client applications 120 and 126 and GUIs 122 and 128.

Various computing devices described with respect to FIG. 1 are communicatively coupled via one or more data networks 116. Examples of a data network 116 include, but are not limited to, internet, a local area network ("LAN"), a wireless area network, a wired area network, a wide area network, and the like.

Figure 2:
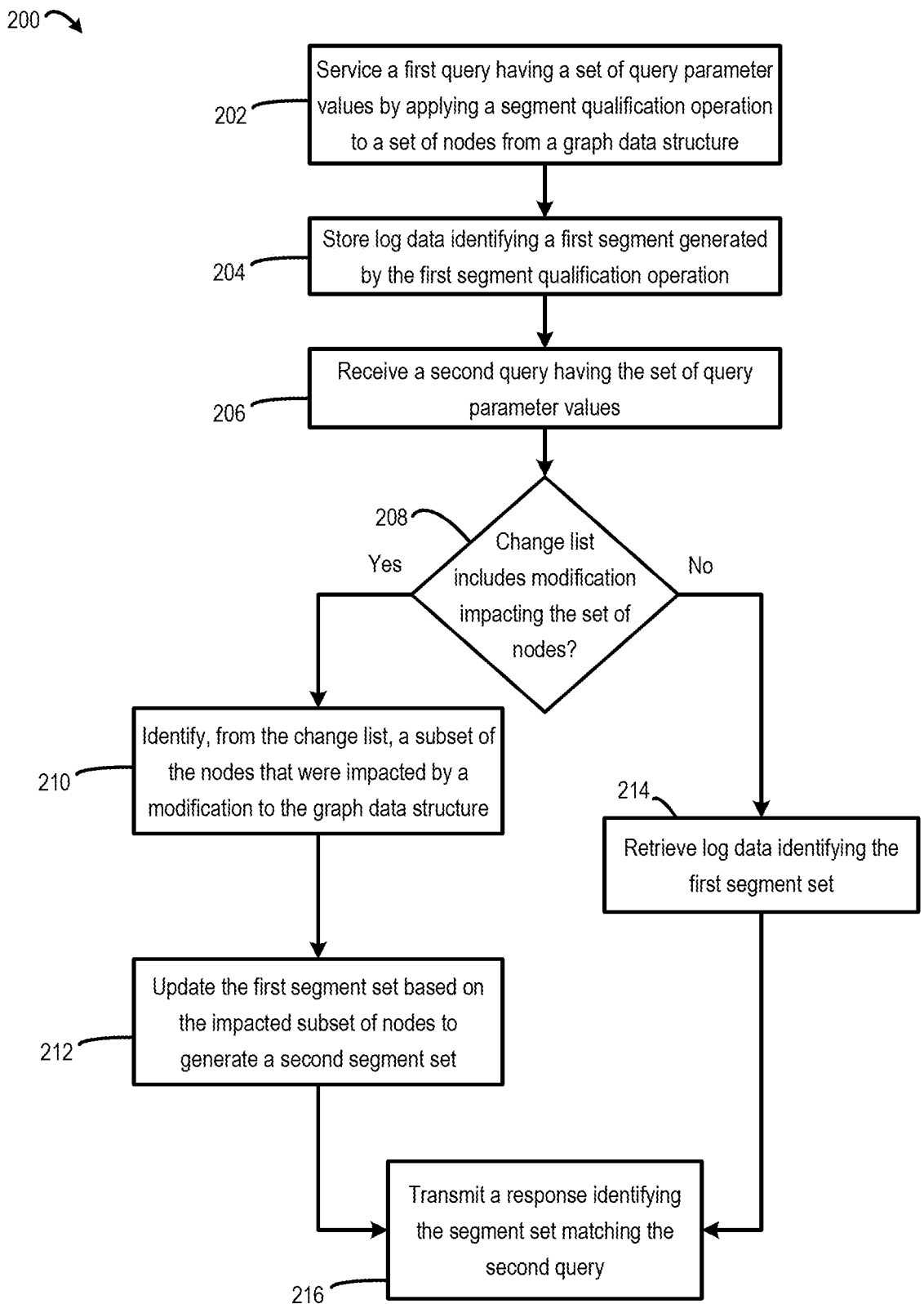
FIG. 2 depicts an example of a process for servicing queries by tracking incremental updates to graph data structures, according to certain embodiments described in this disclosure.

Example of Operations for Servicing Queries by Tracking Incremental Updates to Graph Data Structures FIG. 2 depicts an example of a process 200 process for servicing queries by tracking incremental updates to graph data structures. One or more operations described with respect to FIG. 2 can be used to implement a step for servicing a query based on a change list identifying incremental updates to a graph data structure. In some embodiments, one or more computing devices implement operations depicted in FIG. 2 by executing suitable program code (e.g., the data management engine 104). For illustrative purposes, the process 200 is described with reference to certain examples depicted in the figures. Other implementations, however, are possible.

At block 202, the process 200 involves the data management engine 104 servicing a first query having a set of query parameter values by applying a segment qualification operation to a set of nodes from a graph data structure. For example, the graph data structure 106 could be implemented as a set of key-value indices that indicate which traits are associated with computing devices and online entities and that indicate which computing devices are associated with which online entities. In some embodiments, performing a segment qualification operation involves searching, in a set of such key-value indices that implement the graph data structure, for keys corresponding to the set of nodes and returning sets of nodes having the query parameter values. For instance, as in the example discussed above with respect to FIG. 1, if a set of query parameter values is a set of traits, the data management engine 104 can search the key-value indices for those traits and return a list of devices, entities, or device-entity combinations having that set of traits. Such a list is the segment that is generated in response to a query. A more detailed example of servicing a query is described herein with respect to FIG. 3.

At block 204, the process 200 involves the data management engine 104 storing log data identifying a first segment set generated by the first segment set qualification operation. For instance, the data management engine 104 stores, in a log 112, log data identifying the query parameters received at block 202, a timestamp associated with the query from block 202 (e.g., an identifier of when the query was received or serviced), and the segment returned in response to the query from block 202. The log data therefore identifies certain nodes from the graph data structure 106 that are included in the segment, such as a set of a list of devices, entities, or device-entity combinations.

At block 206, the process 200 involves the data management engine 104 receiving a second query having the set of query parameter values. The second query could be any query, request, or command from a computing device that causes the data management engine 104 to identify the segment specified by the set of query parameters. In one example, the data management engine 104 receives the second query from a different computing device than the computing device that transmitted the first query in block 202. In another example, the data management engine 104 receives the second query from the same computing that transmitted the first query in block 202. The second query could be specified via a user interface at a client device, or could be a request from a client application to refresh the results returned from servicing the first query. For instance, if the client device is displaying the segment at a display device for an extended period of time, the second query could simply be a client application requesting that the segment results be kept current (i.e., refreshed at continuous interval) while displayed.

The data management engine 104 services the second query by performing the operations in blocks 208-216. One or more operations described herein with respect to blocks 208-216 can be used to implement a step for performing a search of the graph data structure that is constrained by a change list for tracking changes to the graph data structure. At block 208, the process 200 involves the data management engine 104 determining whether the set of nodes has been impacted by a modification to the graph data structure. For instance, the data management engine 104 accesses the log 112 and searches for a set of query parameter values matching the query parameter values received at block 206. The data management engine 104 locates log data describing the first segment set and having the set of query parameter values matching the query parameter values received at block 206. The data management engine 104 retrieves the first segment set from the log data. The data management engine 104 also references the change list 110 to determine whether the graph data structure 106 has been modified in such a way as to impact the nodes used to generate the first segment set. For instance, the data management engine 104 identifies the time stamp in the log data for the retrieved first segment set and searches the change list 110 for modifications to the graph data structure 106 that occurred after the identified time stamp.

If the set of nodes has been impacted by a modification to the graph data structure, the process 200 involves the data management engine 104 identifying, from the change list, a subset of the nodes that were impacted by a modification to the graph data structure, as depicted at block 210. For instance, entries in the change list 110 with time stamps subsequent to the retrieved first segment set could indicate that one or more nodes in the first segment set were removed, that edges were added to or removed from one or more nodes in the first segment set, that traits were added to or removed from one or more nodes in the first segment set, that traits included in the set of query parameter values were added to or removed from one or more nodes in graph data structure, etc. The data management engine 104 identifies these changes and the affected nodes listed in the change list 110.

At block 212, the process 200 involves the data management engine 104 generating a second segment set by at least updating the first segment set based on the impacted subset of nodes. For instance, the data management engine 104 could update the first segment set by performing an additional segment qualification operation on the graph data structure 106. The data management engine 104 could limit the additional segment qualification to the nodes that were identified at block 210 as being impacted by the modification to the graph data structure 106. In this manner, the data management engine 104 avoids having to perform computations across an entire graph to identify a qualify segment, such as the computations by conventional computing systems described herein with respect to FIG. 9.

If the set of nodes has not been impacted by a modification to the graph data structure, the process 200 involves the data management engine 104 retrieve log data identifying the first segment set, as depicted at block 214. For instance, the data management engine 104 may return the unchanged first segment set in response to the second query if the search of the change list 110 indicates that no changes to the graph data structure 106 occurred after the first segment set was returned in response to the first query, or if any changes to the graph data structure 106 identified in the change list 110 only involve nodes that do not impact the first segment set.

At block 216, the process 200 involves the data management engine 104 transmitting a response identifying the segment set matching the second query. The segment set transmitted at block 216 includes the second segment set generated at block 212 or the first segment set retrieved at block 214. Transmitting the response could involve transmitting data or code to a computing device that causes the computing device to display the segment set on a display device. For instance, the response could include data identifying the segment set, an instruction to a client device to update a GUI to display the data identifying the segment set, etc. In some embodiments, transmitting a response to the second query identifying the first segment set retrieved at block 214 could involve re-sending the first segment set or sending a message indicating that the first segment set has not changed.

Figure 3:
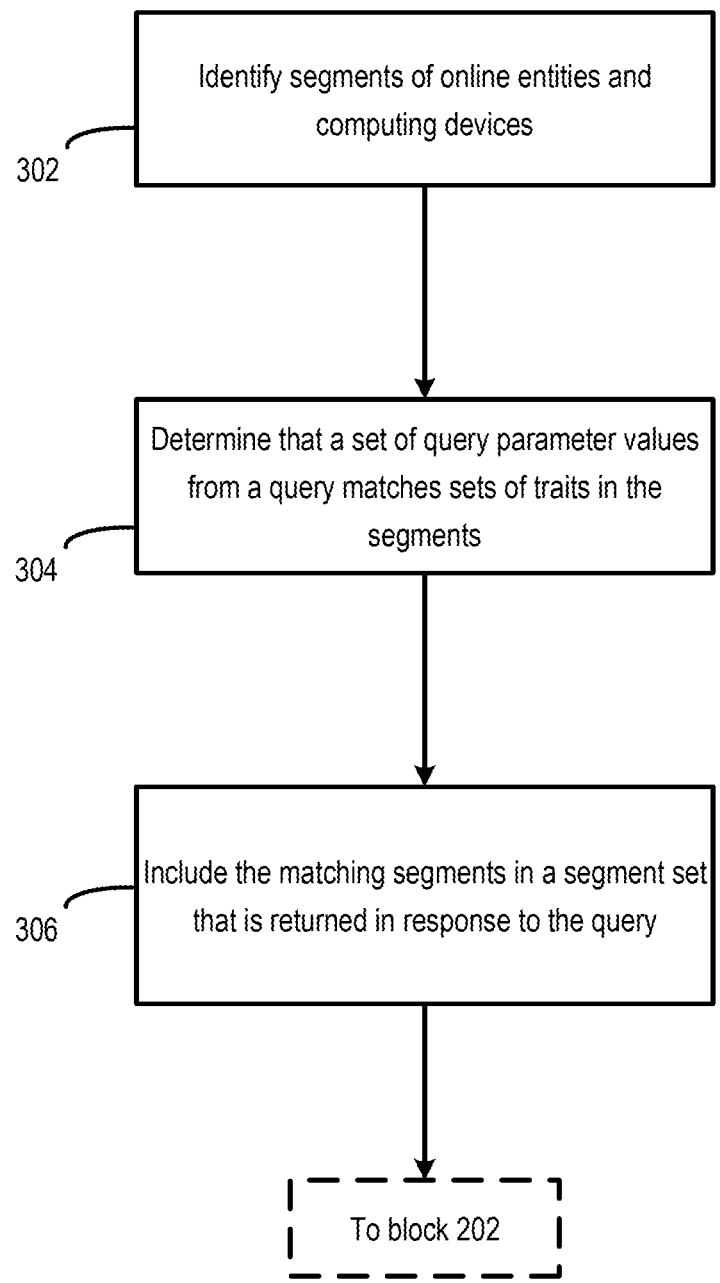
FIG. 3 depicts an example of servicing a query, within the process of FIG. 2, by performing a segment qualification operation on a set of nodes from a graph data structure, according to certain embodiments described in this disclosure.

FIG. 3 depicts an example of a process 300 for servicing a query by performing a segment qualification operation on a set of nodes, according to certain embodiments of this disclosure. One or more operations described with respect to FIG. 3 can be used to implement block 202 of process 200. In some embodiments, one or more computing devices implement operations depicted in FIG. 3 by executing suitable program code (e.g., the data management engine 104). For illustrative purposes, the process 300 is described with reference to certain examples depicted in the figures. Other implementations, however, are possible.

At block 302, the process 300 involves identifying segments of online entities and computing devices. In some embodiments, a set of at least two key-value indices discussed in FIG. 1 are used to identify the nodes. A first key-value index, such as the key-value index from Table 1, identifies traits of computing devices and online entities. At least one other key-value index, such as one of the key-value indices from Tables 2 and 3, identifies relationships between online entities and computing devices.

For instance, in an example involve the key-value indices from Tables 1 and 2, the data management engine 104 identifies each segment having a respective set of traits by identifying, for a computing device, a subset of the online entities that are identified in the key-value index of Table 2 as being linked to the computing device. For instance, a given key-value pair {device A: cross-device B, cross-device C} identifies a computing device with device identifier A and associated online entities with cross-device identifiers B and C. The data management engine 104 identifies the traits for this segment by selecting, from the key-value index of Table 1, traits of the computing device and the online entities. For instance, in the example above, the data management engine 104 references the key-value pairs {device A: trait 1}, {cross-device B: trait 2}, and {cross-device C: trait 3} and identifies traits 1, 2, and 3 as the set of traits for the segment.

In another example involve the key-value indices from Tables 1 and 3, the data management engine 104 identifies each segment having a respective set of traits by identifying, for an online entity, a subset of the computing device that are identified in the key-value index of Table 3 as being linked to the online entity. For instance, a given key-value pair {cross-device X: device Y, device Z} identifies an online entity with cross-device identifier X and associated computing devices with device identifiers Y and Z. The data management engine 104 identifies the traits for this segment by selecting, from the key-value index of Table 1, traits of the computing device and the online entities. For instance, in the example above, the data management engine 104 references the key-value pairs {cross-device X: trait 4}, {cross-device Y: trait 5}, and {cross-device Z: trait 6} and identifies traits 4, 5, and 6 as the set of traits for the segment.

In some embodiments, a merge rule guides the identification of segments. For instance, the data management engine 104 receives, via communications with one or more client devices, a selection or definition of a merge rule. The merge rule specifies how profiles for various computing devices, online entities, or both should be grouped together into segments. In one example, a merge rule could indicate that traits associated with certain online entities will be merged with traits associated with computing devices that are linked to the online entities in the graph data structure 106.

Figure 4:
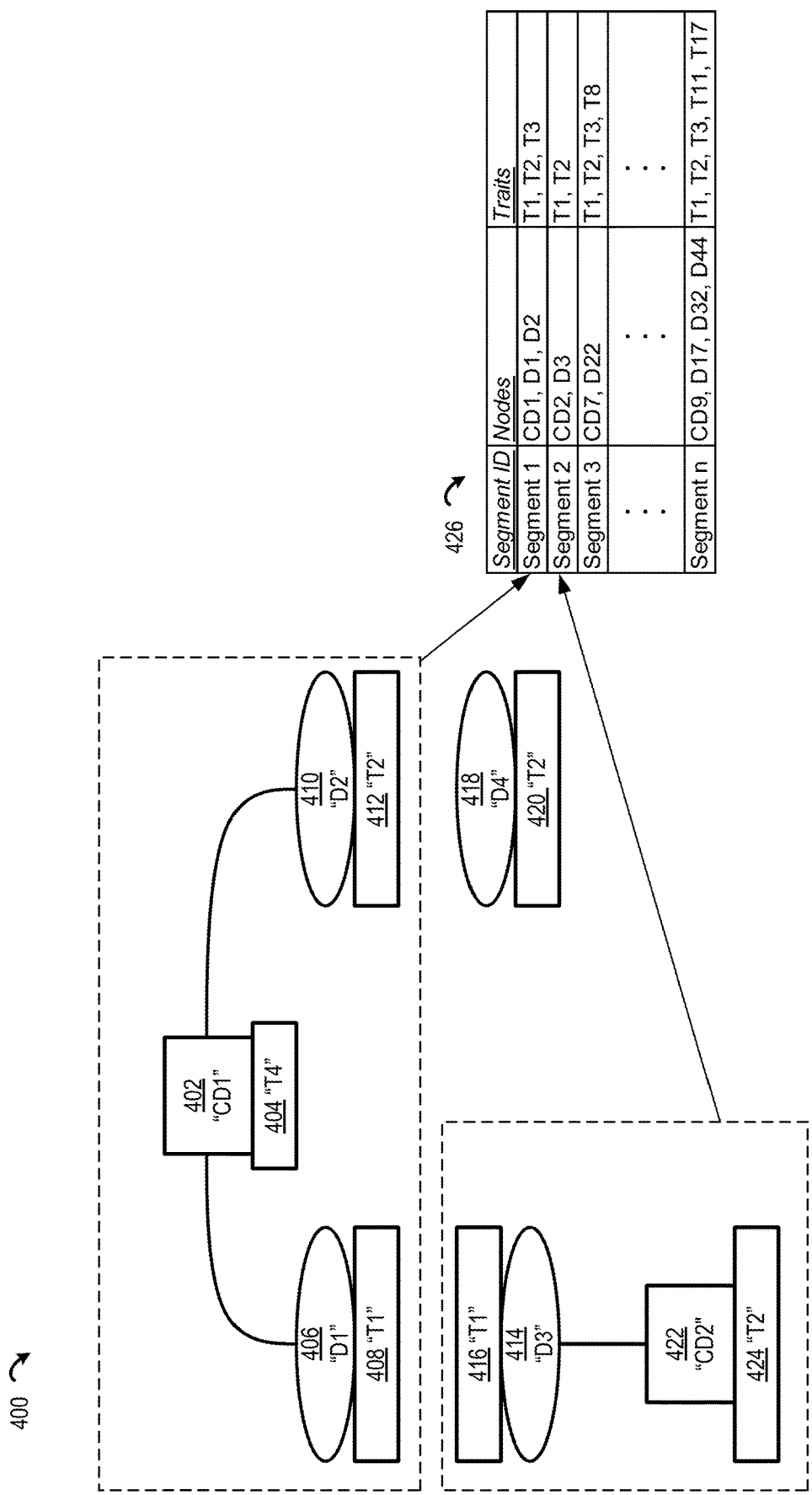
FIG. 4 depicts an example of a portion of a graph data structure that is used in the process of FIG. 3, according to certain embodiments described in this disclosure.

FIG. 4 depicts an example of a graph portion 400 of a graph data structure 106. In this example, the graph portion 400 includes nodes 402 and 424 respectively representing a set of cross-device identifiers "CD1" and "CD2." The graph portion 400 also includes nodes 406, 410, 414, and 418 respectively representing a set of device identifiers "D1," "D2," "D3," and "D4." The graph portion 400 also includes various traits 408, 412, 416, 420, and 424 having various trait values (e.g., "T1," "T2," and "T3").

In this example, the online entities with cross-device identifiers CD1 and CD2, represented by nodes 402 and 424, meet the merging criteria in a merge rule (e.g., the last known authentication-based profile). The data management engine 104 merges any device identifiers linked to those cross-device identifiers into segments. For illustrative purposes, FIG. 4 depicts a table 426 that identifies each segment, the nodes within the segment, and the traits of the segment. In some embodiments, the table 426 or another suitable data structure could be stored in the log 112 and used to identify the available segments from which qualifying segments are identified. In FIG. 4, the data management engine 104 generates a record identifying a Segment 1 that includes CD1, D1, and D2, as well as the collection of traits associated with one or more of CD1, D1, and D2 (i.e., T1, T2, T3). The data management engine 104 also generates a record identifying a Segment 2 that includes CD2 and D3, as well as the collection of traits associated with one or more of CD2, and D3 (i.e., T1, T2). In this example, table 426 also includes Segments 3 through n that are generated by applying the merge rule to other portions of the graph data structure 106.

The examples of merge rules described above are provided for illustrative purposes. Other examples of merge rules could be used. Additional examples of merge rules and procedures for defining the merge rules are described, for example, in U.S. Patent Publication No. 2017/0124595 at paragraphs [0024]-[0050], which are incorporated by reference herein.

In some embodiments, a merge rule indicates which change list should be used for servicing queries. For instance, the graph data structure 106 could be implemented using three key-value indices, such as the indices in Tables 1-3. A first change list could identify changes to online entities (i.e., cross-device identifiers) in the graph data structure 106, and a second change list could identify changes to online entities (i.e., device identifiers) in the graph data structure 106. If the merge rule indicates that segments are built by grouping cross-device identifiers linked to the same device identifier, the data management engine 104 selects the first change list. If the merge rule indicates that segments are built by grouping device identifiers linked to the same cross-device identifier, the data management engine 104 selects the second change list.

Returning to FIG. 3, at block 304, the process 300 involves determining that a set of query parameter values from a query matches sets of traits in the segments. For instance, the data management engine 104 could receive a query from a client device, as described in the examples above with respect to FIGS. 1 and 2. The set of query parameter values in the query could identify certain traits (e.g., IP address, operating system, etc.) and trait values (e.g., range of IP addresses, specified types of operations systems, etc.). In one example, if a segment's traits and trait values at least include all traits and trait values identified in the set of query parameter values, then the segment's traits match the set of query parameter values. For instance, if the query parameters include trait values T1, T2, and T3, then the data management engine 104 would identify at least segments 1, 3, and n from table 426 as matching the set of query parameter values.

At block 306, the process 300 involves including the segments in a segment set that is returned in response to the query. For instance, if the data management engine 104 determines that if a segment's traits and trait values at least include all traits and trait values identified in the set of query parameter values, the data management engine 104 adds that segment to a segment set. In the example depicted in FIG. 4, the data management engine 104 would add at least segments 1, 3, and n to a segment set. The data management engine 104 can transmit the segment set, log the segment set, or both as described above with respect to FIG. 2.

Figure 5:
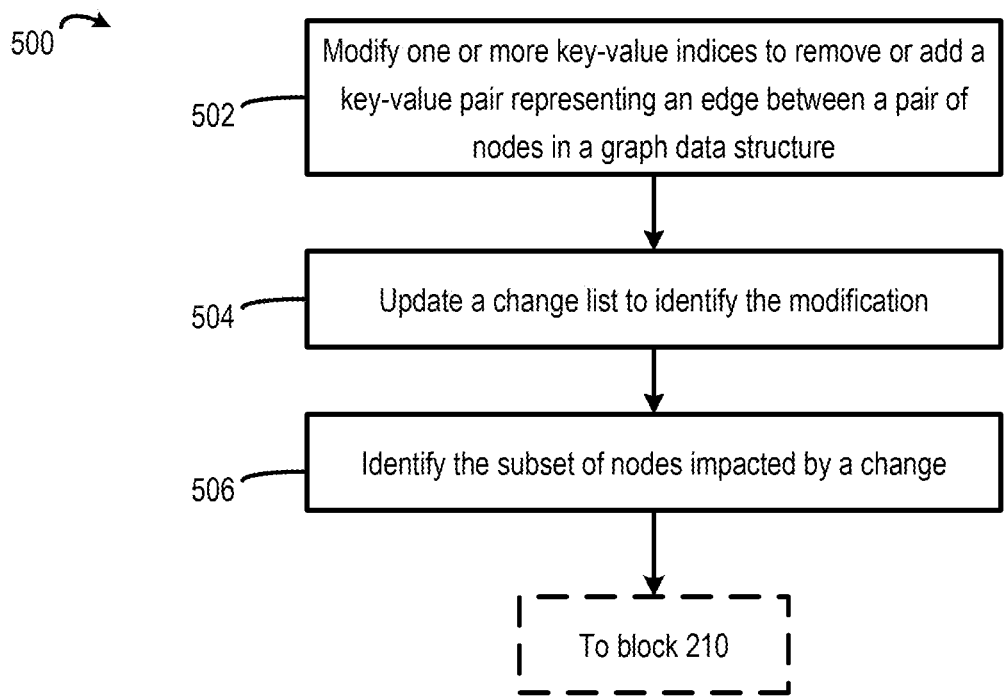
FIG. 5 depicts an example of a process for identifying, from a change list, a subset of nodes impacted by changes to edges of a graph data structure for use by the process in FIG. 2, according to certain embodiments described in this disclosure.

FIG. 5 depicts an example of a process 500 for identifying, from a change list, a subset of nodes impacted by changes to edges of a graph data structure. One or more operations described with respect to FIG. 5 can be used to implement, for example, block 210 of the process 200. In some embodiments, one or more computing devices implement operations depicted in FIG. 5 by executing suitable program code (e.g., the data management engine 104). For illustrative purposes, the process 500 is described with reference to certain examples depicted in the figures. Other implementations, however, are possible.

At block 502, the process 500 involves modifying one or more key-value indices to remove or add a key-value pair representing an edge between a pair of the nodes in a graph data structure. For instance, as discussed above with respect to FIG. 1, the graph data structure 106 could be implemented with a set of three key-value indices. A first key-value index, such as the example from Table 1, could include keys identifying computing devices and online entities, with values corresponding to the keys and identifying the traits of the computing devices and the online entities. A second key-value index, such as the example from Table 2, could include keys identifying computing devices, with values corresponding to the keys and identifying online entities (e.g., a key-value pair in which a key is a device identifier and a value is a cross-device identifier). A third key-value index, such as the example from Table 3, could include keys identifying online entities, with values corresponding to the keys and identifying computing devices (e.g., a key-value pair in which a key is a cross-device identifier and a value is a device identifier).

In this example, the data management engine 104 removes an edge from the graph data structure 106 by modifying one or more of the second or third key-value indices. For instance, the data management engine 104 could receive a "RemoveEdge" command. To implement the "RemoveEdge" command, the data management engine 104 removes, from the second key-value index, a key-value pair in which a key is a device identifier and a value is a cross-device identifier. The data management engine 104 could also remove, from the third key-value index, a key-value pair in which a key is a cross-device identifier and a value is a device identifier This removal of the key-value pairs indicates that the computing device and the online entity are no longer associated in the graph data structure 106, i.e., that the edge between the pair of nodes respectively representing the computing device and the online entity has been removed.

Similarly, in this example, the data management engine 104 adds an edge to the graph data structure 106 by modifying one or more of the second or third key-value indices. For instance, the data management engine 104 could receive an "AddEdge" command. To implement the "AddEdge" command, the data management engine 104 adds, to the second key-value index, a key-value pair in which a key is a device identifier and a value is a cross-device identifier). The data management engine 104 could also add, to the third key-value index, a key-value pair in which a key is a cross-device identifier and a value is a device identifier This addition of the key-value pairs indicates that the computing device and the online entity are now associated in the graph data structure 106, i.e., that an edge between the pair of nodes respectively representing the computing device and the online entity has been added.

At block 504, the process 500 involves updating a change list to identify the modification. For instance, the data management engine 104 could update the change list 110 to identify which nodes in the graph data structure 106 are modified. The update to the change list could simply indicate which nodes were modified, or could indicate both the nodes that were modified and the nature of the modification (e.g., addition of an edge, removal of an edge, etc.).

At block 506, the process 500 involves identifying the subset of nodes impacted by a change. For example, the data management engine 104 compares the change list 110 to a retrieved segment to identify which nodes in the retrieved segment have been affected by changes since servicing the query that resulted in the segment. The identified subset of nodes is provided to block 210 of the process 200.

Figure 6:
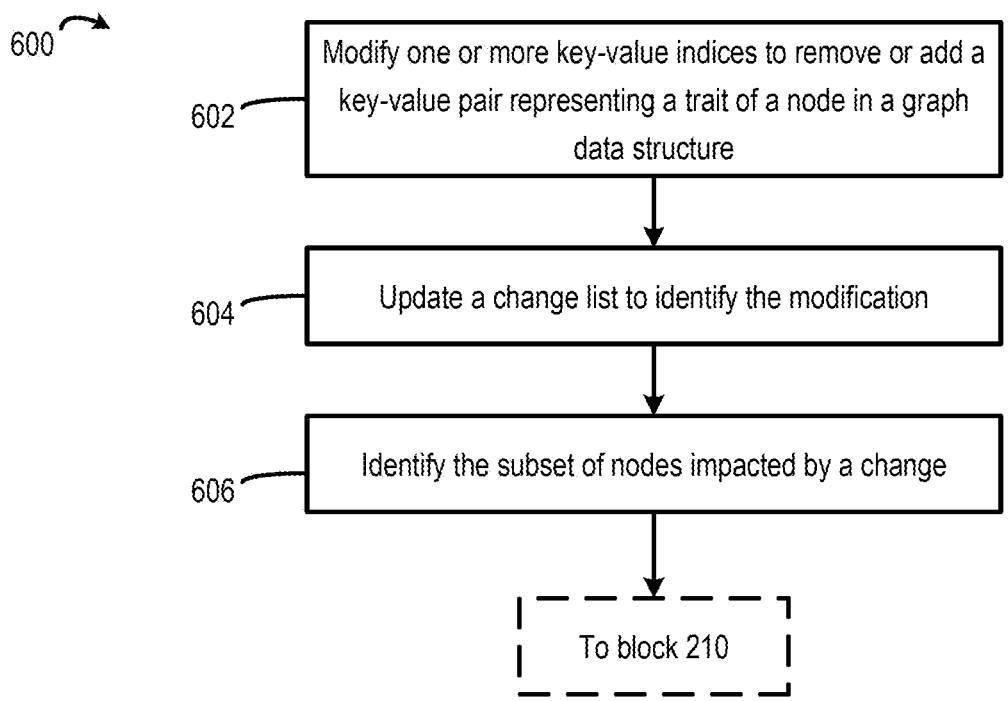
FIG. 6 depicts an example of a process for identifying, from a change list, a subset of nodes impacted by changes to traits in a graph data structure for use by the process in FIG. 2, according to certain embodiments described in this disclosure.

FIG. 6 depicts an example of a process 600 for identifying, from a change list, a subset of nodes impacted by changes to traits in a graph data structure. One or more operations described with respect to FIG. 6 can be used to implement, for example, block 210 of the process 200. In some embodiments, one or more computing devices implement operations depicted in FIG. 6 by executing suitable program code (e.g., the data management engine 104). For illustrative purposes, the process 600 is described with reference to certain examples depicted in the figures. Other implementations, however, are possible.

At block 602, the process 600 involves modifying one or more key-value indices to remove or add a key-value pair representing a trait of a node in a graph data structure. For instance, as discussed above with respect to FIGS. 1 and 4, the graph data structure 106 could be implemented with a set of three key-value indices. In this example, block 602 involves the data management engine 104 accessing the first key-value index, such as the example from Table 1, that includes keys identifying computing devices and online entities, with values corresponding to the keys and identifying the traits of the computing devices and the online entities. The data management engine 104 modifies the graph data structure 106 by removing or adding a key-value pair in which a key is a device identifier or cross-device identifier and a corresponding value identifies one or more traits.

At block 604, the process 600 involves updating a change list to identify the modification. For instance, the data management engine 104 could update the change list 110 to identify which nodes in the graph data structure 106 are modified. The update to the change list could simply indicate which nodes were modified, or could indicate both the nodes that were modified and the nature of the modification (e.g., addition of a trait, removal of a trait, etc.).

At block 606, the process 600 involves identifying, the subset of nodes impacted by a change. For example, the data management engine 104 compares the change list 110 to a retrieved segment to identify which nodes in the retrieved segment have been affected by changes since servicing the query that resulted in the segment. The identified subset of nodes is provided to block 210 of the process 200.

Figure 7:
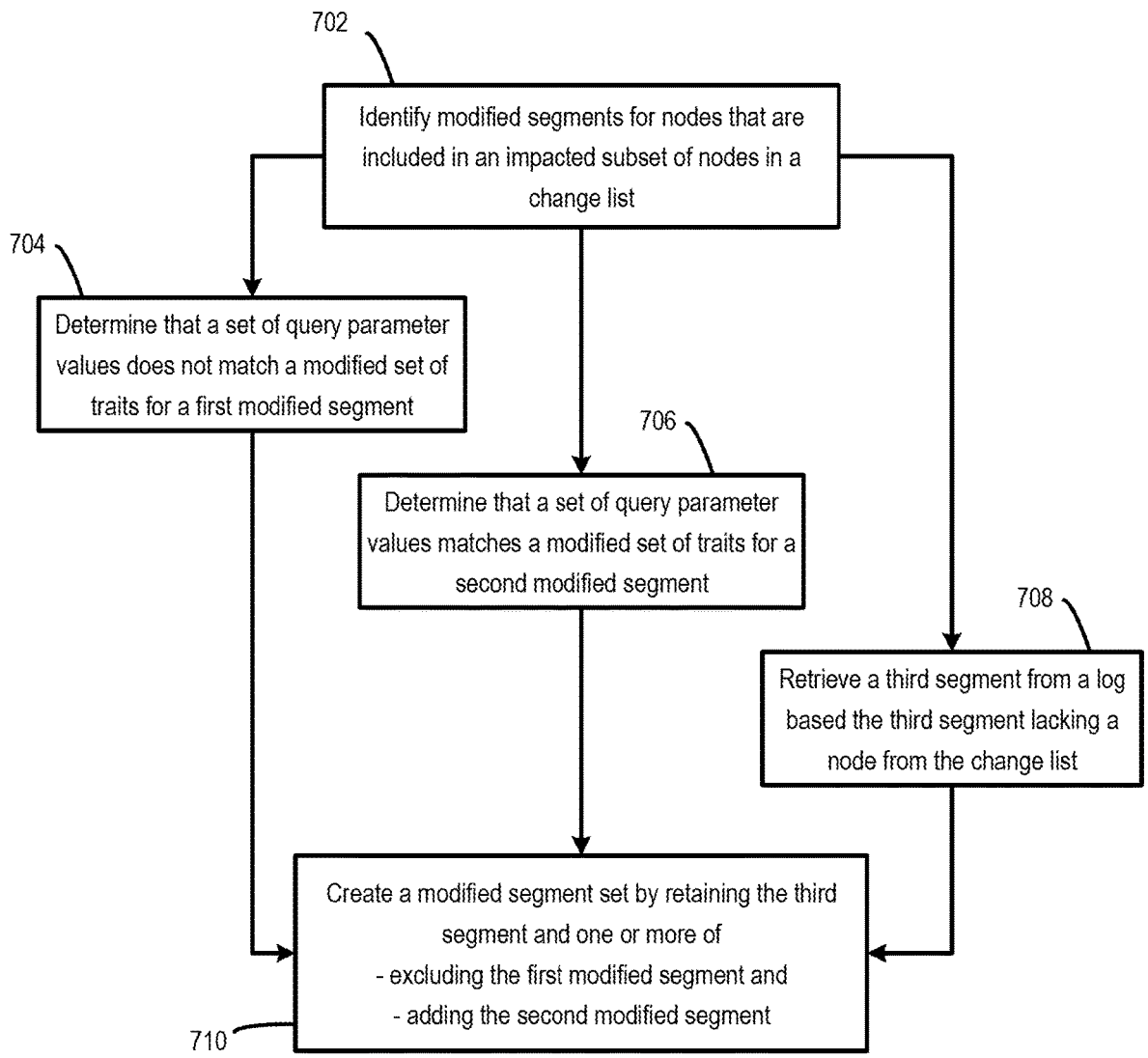
FIG. 7 depicts an example of a process for performing, within the process of FIG. 2, a segment qualification operation that is limited to a subset of nodes impacted by a change to a graph data structure, according to certain embodiments described in this disclosure.

FIG. 7 depicts an example of a process 700 for performing a segment qualification operation that is limited to a subset of nodes impacted by a change to a graph data structure, according to certain embodiments of this disclosure. One or more operations described with respect to FIG. 3 can be used to implement block 212 of process 200. In some embodiments, one or more computing devices implement operations depicted in FIG. 7 by executing suitable program code (e.g., the data management engine 104). For illustrative purposes, the process 700 is described with reference to certain examples depicted in the figures. Other implementations, however, are possible.

At block 702, the process 700 involves the data management engine 104 identifying modified segments for nodes that are included in the impacted subset of nodes. For instance, the data management engine 104 identifies, from a change list, one or more online entities or one or more computing devices that were affected by a change to the graph data structure 106. The data management engine 104 executes the operations described above with respect to block 302, but limits those operations to the set of nodes identified in the change list. As an example, if a previous query was serviced by identifying and searching a first segment and a second segment, and the second segment lacks any nodes identified in the change list, then the data management engine 104 only identifies a modified version of the first segment at block 702.

Figure 8:
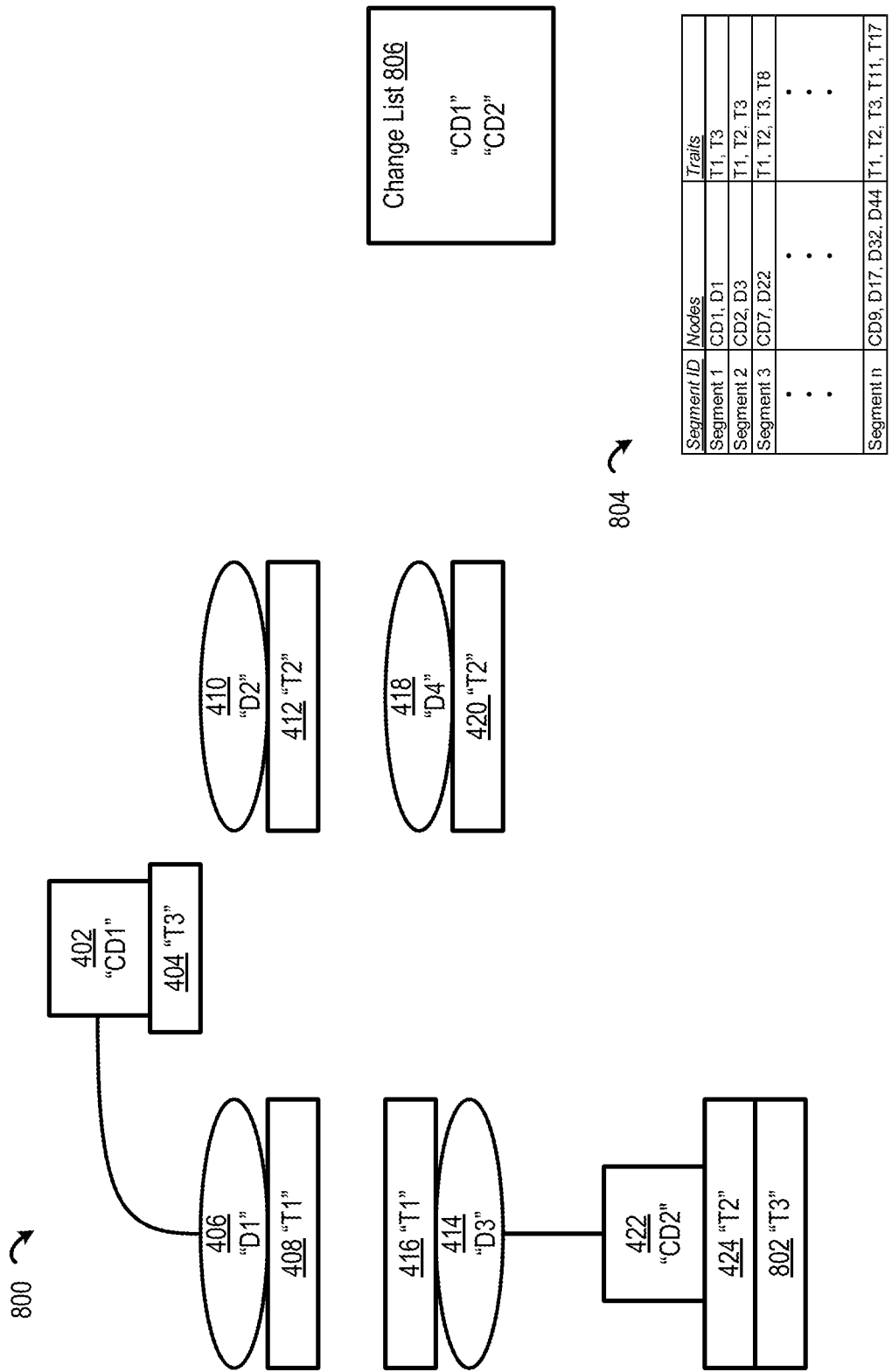
FIG. 8 depicts an example of a modified portion of a graph data structure that is used in the process of FIG. 3, according to certain embodiments described in this disclosure.

For instance, FIG. 8 depicts an example of a modified graph portion 800 of a graph data structure 106. In this example, the graph portion 800 is a modified version of the graph portion 400 from FIG. 4. Here, the graph data structure 106 has been modified by removing the edge between nodes 402 and 410, and by adding trait 802 having trait value "T3" to node 422. In this simplified example, the change list 806 only indicates that CD1 and CD2 have been impacted by these modifications. The data management engine 104 therefore identifies the nodes 402 and 422, which respectively represented CD1 and CD2, as being impacted by the modifications. Based on this impact, the data management engine 104 identifies the modified segments that include the online entities for nodes CD1 and CD2, but does not identify modified segments for any non-impacted nodes (e.g., CD7 and CD9 listed in the table 804). Thus, the data management engine 104 modifies segments 1 and 2, as indicated in table 804, but leaves segments 3-n unchanged.

Returning to FIG. 7, at block 704, the process 700 involves the data management engine 104 determining that a set of query parameter values does not match a modified set of traits for a first modified segment. For instance, the data management engine 104 could receive a query from a client device, as described in the examples above with respect to FIGS. 1 and 2. The set of query parameter values in the query could identify certain traits (e.g., IP address, operating system, etc.) and trait values (e.g., range of IP addresses, specified types of operations systems, etc.). In one example, if a segment's traits and trait values include all traits and trait values identified in the set of query parameter values, then the segment's traits match the set of query parameter values. For instance, if the query parameters include trait values T1, T2, and T3, then the data management engine 104 would determine that at least segment 1 from table 804 does not match the set of query parameter values.

At block 706, the process 700 involves the data management engine 104 determining that the set of query parameter values matches a modified set of traits for a second modified segment. In the example above, if a segment's traits and trait values at least include all traits and trait values identified in the set of query parameter values, then the segment's traits match the set of query parameter values. For instance, if the query parameters include trait values T1, T2, and T3, then the data management engine 104 would determine that at least segment 2 from table 804 matches the set of query parameter values.

At block 708, the process 700 involves the data management engine 104 retrieving a third segment from a log based the third segment lacking a node from the change list. For instance, in the example of FIG. 8, the nodes for segments 3-n are not identified in the change list. Thus, the data management engine 104 retrieves these previously identified segments from a log because the segments 3-n lack the nodes CD1 and CD2 identified in the change list.

At block 710, the process 700 involves creating a modified segment set by retaining the third segment and performing one or more of excluding the first modified segment from the segment set and adding the second modified segment to the segment set. For instance, in the example of FIG. 8, the data management engine 104 services a query for traits T1, T2, and T3 by creating a modified segment set that includes the modified segment 2 identified at block 702 and the segments 3-n retrieved at block 708. The data management engine 104 also excludes, from the modified segment set, the modified segment 1 because the data management engine 104 determined at block 706 that the modified segment 1 does not include the traits T1, T2, and T3. The data management engine 104 transmits a response identifying the modified segment set in response to the query.

The example described above with respect to FIG. 8 is simplified for illustrative purposes. For instance, while FIG. 8 depicts a change list 806 having only two entries, a change list could include a larger number of entries, with only the relevant entries being considered in blocks 702-710. The relevant entries to the change list would be the entries that were created after servicing a query that caused segments 3-n to be identified and prior to servicing the query that caused modified segments 1 and 2 to be identified.

In some embodiments, certain implementations of the computing environment from FIG. 1 can improve the processing described above with respect to FIGS. 2-8. For instance, the data management engine 104 could partition the graph data structure 106 into sub-graphs and distribute the sub-graphs on a cluster of computing nodes, such that each subgraph is stored on a respective computing node's local memory. Doing so can help to exploit locality and caching for each computing node. The data management engine 104 could also maintain an index mapping for each node (i.e., vertex) in the data graph and the computing node on the graph node is stored. Change lists on a single computing node can be processed together, thereby increasing data locality and cache locality and reducing node jumping while traversing the subgraph.

In embodiments involving distributed graphs, changes over different subgraphs could be executed on different computing nodes in parallel for further computational efficiency. For instance, a change list or an index mapping could identify both the graph node that is impacted and a computing node on which a corresponding sub-graph is located. In a simplified example, a change list or an index mapping could indicate that graph nodes D1 and D2 have been impacted by a modification to the graph data structure and that graph nodes D1 and D2 are included in two different sub-graphs stored on computing nodes A and B, respectively. In parallel, the computing node A can perform process 700 with for the graph node D1, and the computing node B can perform process 700 with for the graph node D2. The data management engine 104 could therefore identify updated segments for graph nodes D1 and D2 and service a query using these segments more efficiently.

Figure 9:
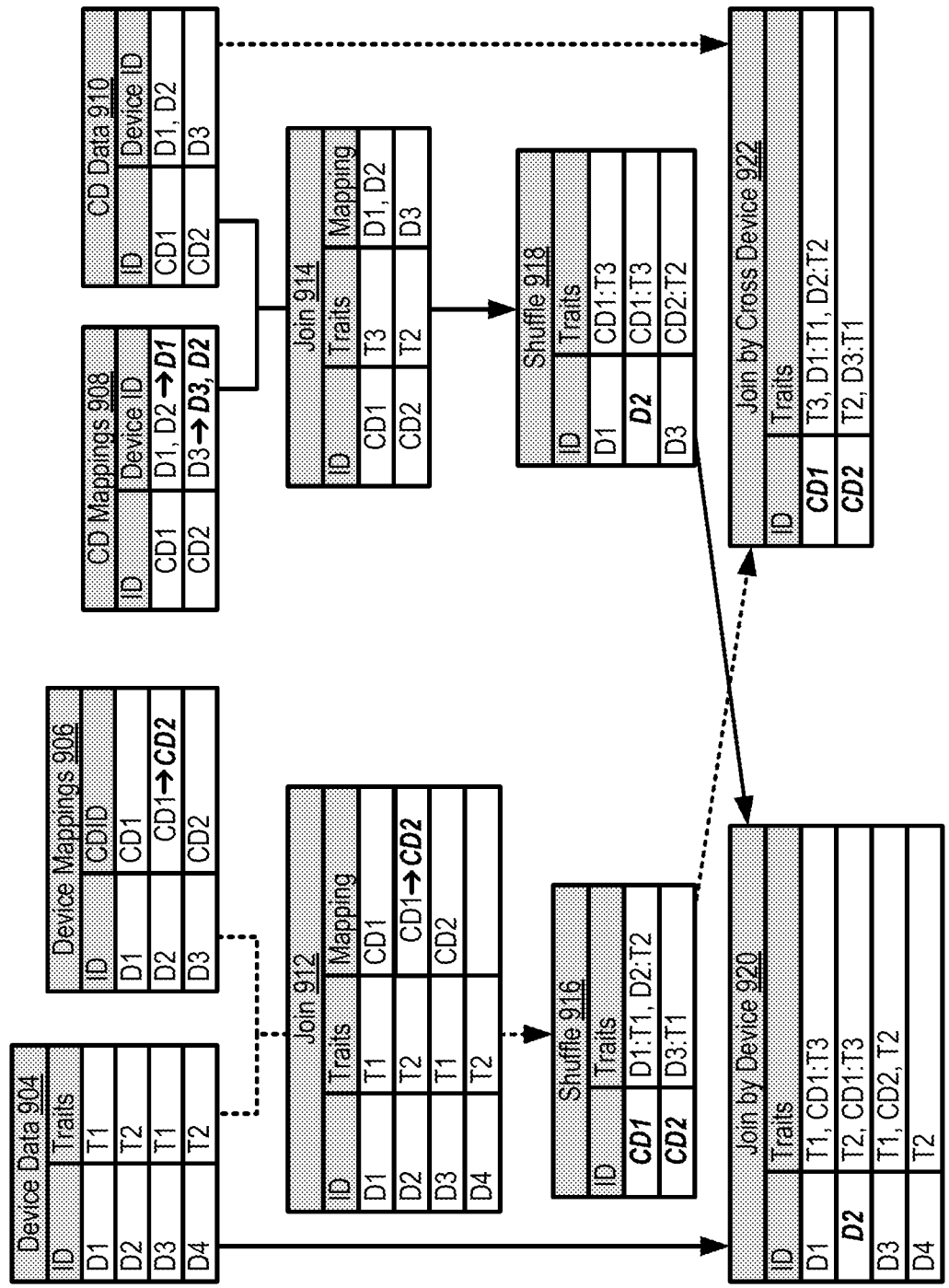
FIG. 9 depicts an example of conventional techniques that involve operations avoided by certain embodiments described in this disclosure.

Examples of Computational Improvements Facilitated by Tracking Incremental Graph Updates The embodiments described above with respect to FIGS. 1-8 can enable faster response times and interactive access to query results than, for instance, conventional batch-oriented approaches to servicing queries with a graph data structure. For instance, a conventional approach to servicing a query from a graph data structure is depicted in FIG. 9. In this example, the entire data graph, which is implemented using the indices 904, 906, 908, and 910, needs to be processed to generate a tables "Join By Device" table 920 and "Join By Cross Device" table 922. For instance, to find a segment that satisfies trait list {T1, T2, T3}, a conventional system would need to build the join table 912 and the shuffle table 916 from the indices 904 and 906 or to build the join table 914 and the shuffle table 918 from the indices 908 and 910. If an edge between nodes is removed from the graph, returning the correct qualifying segment for {T1, T2, T3} would require the conventional system to update the "Join By Device" table 920 via batch computation over the entire graph (e.g., re-building the join table 912 and the shuffle table 916). But this batch computation over the entire graph is wasteful, since only a sub-region of the graph has changed.

The embodiments described herein can avoid these wasteful computations by implementing the graph data structure as a set of key-value indices, as in the examples of Tables 1-3, and maintain one or more change lists to track nodes in the graph data structure that have changed. By applying merge rules (i.e., performing segment qualifications) to the changed nodes instead of the entire graph, wasteful computation is reduced or eliminated.

For instance, Table 4 depicts experiment results for the processing time involved with updating edges of a graph data structure, updating vertices (i.e., traits) of a graph data structure, and evaluating segments (e.g., servicing queries) using the embodiments described herein.

TABLE 4

| Event Name | Min. Time (s) | Max. Time (s) | Avg. Time (s) |
|---|---|---|---|
| UpdateEdge | 0.5 | 47.7 | 9.7 |
| UpdateVertex | 0.1 | 0.7 | 0.1 |
| Evaluate Segment | 0.9 | 28.6 | 1.1 |

Table 5 depicts experiment results for the processing time involved with updating edges of a graph data structure, updating vertices (i.e., traits) of a graph data structure, and evaluating segments (e.g., servicing queries) using conventional techniques rather than the embodiments described herein.

TABLE 5

| Event Name | Total Avg. Execution Time for All Events |
|---|---|
| UpdateEdge | 842.5 seconds |
| UpdateVertex | 770.5 seconds |
| Evaluate Segment | more than 2 hours |

As indicated by the comparison of Tables 4 and 5, updating edges and nodes by modifying a set of three key-values indices, such as the examples in Tables 1-3, results in significantly reduced processing time for updating edges or traits in the graph data structure as compared to conventional techniques. Similarly, using change lists to limit segment qualification operations to nodes affected by changes to graphs can allow segments to be identified for queries in a matter of seconds rather than hours.

Example of a Computing System for Implementing Certain Embodiments

Figure 10:
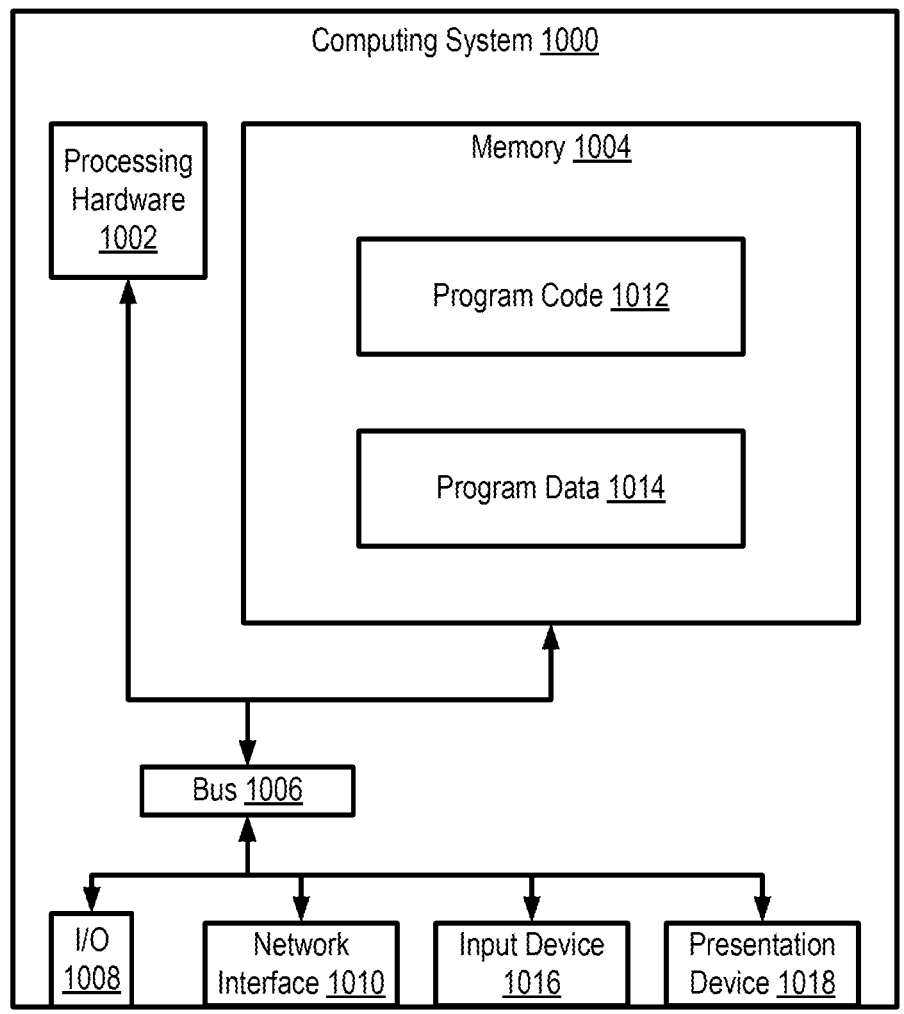
FIG. 10 depicts an example of a computing system for implementing one or more embodiments described in this disclosure.

Any suitable computing system or group of computing systems can be used for performing the operations described herein. For example, FIG. 10 depicts an example of a computing system 1000. In some embodiments, the computing system 1000 includes processing hardware 1002 that executes program code 1012 (e.g., the data management engine 104, etc.), a memory device 1004 that stores one or more sets of program data 1014 computed or used by operations in the program code 1012, one or more input devices 1016, and one or more presentation devices 1018 for displaying graphical content generated by executing the program code 1012. For illustrative purposes, FIG. 10 depicts a single computing system on which the program code 1012 is executed, the program data 1014 is stored, and the input devices 1016 and presentation device 1018 are present. But various applications, datasets, and devices described can be stored or included across different computing systems having devices similar to the devices depicted in FIG. 10.

The depicted example of a computing system 1000 includes processing hardware 1002 communicatively coupled to one or more memory devices 1004. The processing hardware 1002 executes computer-executable program code stored in a memory device 1004, accesses information stored in the memory device 1004, or both. Examples of the processing hardware 1002 include a microprocessor, an application-specific integrated circuit ("ASIC"), a field-programmable gate array ("FPGA"), or any other suitable processing device. The processing hardware 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code 1012. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 1012 may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as an input device 1016, a presentation device 1018, or other input or output devices. For example, the computing system 1000 is shown with one or more input/output ("I/O") interfaces 1008. An I/O interface 1008 can receive input from input devices (e.g., input device 1016) or provide output to output devices (e.g., presentation device 1018). One or more buses 1006 are also included in the computing system 1000. The bus 1006 communicatively couples one or more components of a respective one of the computing system 1000.

The computing system 1000 executes program code 1012 that configures the processing hardware 1002 to perform one or more of the operations described herein. The program code 1012 includes, for example, the data management engine 104 or other suitable program code that performs one or more operations described herein. The program code 1012 may be resident in the memory device 1004 or any suitable computer-readable medium and may be executed by the processing hardware 1002 or any other suitable processor. The program code 1012 uses or generates program data 1014. Examples of the program data 1014 include one or more of the graph data, change lists, segments, edges, vertices, logs, statistics, etc. described herein with respect to FIGS. 1-8.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, or the like. The computing system 1000 is able to communicate with one or more other computing devices via a data network using the network interface device 1010.

An input device 1016 can include any device or group of devices suitable for receiving visual, auditory, or other suitable input that controls or affects the operations of the processing hardware 1002. Non-limiting examples of the input device 1016 include a recording device, a touchscreen, a mouse, a keyboard, a microphone, a video camera, a separate mobile computing device, etc. A presentation device 1018 can include any device or group of devices suitable for providing visual, auditory, or other suitable sensory output. Non-limiting examples of the presentation device 1018 include a touchscreen, a monitor, a separate mobile computing device, etc.

Although FIG. 10 depicts the input device 1016 and the presentation device 1018 as being local to the computing device that executes the program code 1012, other implementations are possible. For instance, in some embodiments, one or more of the input device 1016 and the presentation device 1018 can include a remote client-computing device that communicates with the computing system 1000 via the network interface device 1010 using one or more data networks described herein.

General Considerations

While the present subject matter has been described in detail with respect to specific embodiments thereof, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

The invention claimed is:

1. A method in which one or more processing devices performs operations comprising:
   receiving a first query having a set of query parameter values with respect to traits of computing devices for accessing interactive computing environments and traits of online entities that are authenticated by the interactive computing environments;
   identifying a first segment of at least one first online entity and at least one first computing device selected as being linked, the first segment having a first set of traits;
   identifying a second segment of at least one second online entity and at least one second computing device selected as being linked, the second segment having a second set of traits;
   determining that the set of query parameter values matches the first set of traits and the second set of traits;
   including the first segment and the second segment in a first segment set involving nodes of a graph data structure;
   storing, in a log or a database on a storage device, log data identifying the first segment set;
   receiving a second query having the set of query parameter values; and
   servicing the second query based on a change list identifying modifications to the graph data structure, wherein servicing the second query comprises identifying, from the change list, a subset of the nodes impacted by a modification to the graph data structure including the first segment and the second segment.

2. The method of claim 1, wherein:
   the graph data structure comprises:
   (a) a first key-value index identifying the nodes and traits of the nodes, wherein keys of the first key-value index identify the online entities and the computing devices, wherein values of the first key-value index identify the traits of the online entities and the traits of the computing devices, and
   (b) a second key-value index identifying edges connecting at least some of the nodes in the graph data structure, wherein keys of the second key-value index identify the computing devices and values of the second key-value index identify sets of the online entities linked to the computing devices, wherein the method further comprises:

determining that the first computing device is included in the impacted subset of nodes, identifying a modified first segment having a modified set of traits by (a) selecting the first computing device and a subset of the online entities identified in the second key-value index as being linked to the first computing device and (b) selecting, as the modified set of traits, traits of the first computing device from the first key-value index and traits of the subset of the online entities from the first key-value index, determining that the set of query parameter values does not match the modified set of traits, retrieving the second segment from the log or the database based on the second computing device being absent from the impacted subset of nodes, and creating the second segment set by excluding the first modified segment and retaining the second segment from the first segment set.

3. The method of claim 1, wherein:

the graph data structure comprises:

(a) a first key-value index identifying the nodes of the graph data structure and traits of the nodes, wherein keys of the first key-value index identify the computing devices and the online entities, wherein values of the first key-value index identify the traits of the computing devices and the traits of the online entities, and (b) a second key-value index identifying edges connecting at least some of the nodes in the graph data structure, wherein keys of the second key-value index identify the online entities and values of the second key-value index identify sets of the computing devices linked to the online entities, wherein the method further comprises:

determining that the first online entity is included in the impacted subset of nodes, identifying a modified first segment having a modified set of traits by (a) selecting the first online entity and a subset of the computing devices identified in the second key-value index as being linked to the first online entity and (b) selecting, as the modified set of traits, traits of the first online entity from the first key-value index and traits of the subset of the computing devices from the first key-value index, retrieving the second segment from the log or the database based on the second online entity being absent from the impacted subset of nodes, determining that the set of query parameter values does not match the modified set of traits, and creating the second segment set by excluding the first modified segment and retaining the second segment from the first segment set.

4. The method of claim 1, wherein the operations further comprise, subsequent to receiving the first query and prior to the modification to the graph data structure:

receiving an additional query having the set of query parameter values by at least:

retrieving the first segment set from the log or the database, determining, from the change list, that no modification has impacted a subset of the nodes that is identified in the first segment set, and transmitting an additional response identifying the first segment set.

5. The method of claim 1, wherein a plurality of key-value indices implement the graph data structure, wherein the operations further comprise:

applying a modification to one or more of the key-value indices, wherein the modification to the one or more of the key-value indices adds or removes an edge between a pair of the nodes in the graph data structure; and updating the change list to identify the modification to the one or more of the key-value indices.

6. The method of claim 5, wherein the plurality of key-value indices comprises:

a first key-value index identifying the nodes of the graph data structure and traits of the nodes, wherein keys of the first key-value index identify the computing devices and the online entities, wherein values of the first key-value index identify the traits of the computing devices and the traits of the online entities;

a second key-value index identifying edges connecting at least some of the nodes in the graph data structure, wherein keys of the second key-value index identify the computing devices and values of the second key-value index identify sets of the online entities linked to the computing devices; and a third key-value index identifying additional edges connecting at least some of the nodes in the graph data structure, wherein keys of the third key-value index identify the online entities and values of the third key-value index identify sets of the computing devices linked to the online entities.

7. The method of claim 6, the operations further comprising:

applying an additional modification to the first key-value index by adding or removing a key-value pair;

updating the change list to identify the additional modification;

receiving, subsequent to the additional modification being applied, a third query having the set of query parameter values; and servicing the third query by at least:

retrieving, from the storage device, log data identifying the second segment set, determining, from the change list, that the additional modification has impacted traits in a subset of the nodes that is identified in the second segment set, generating a third segment set by at least updating, based on the impacted traits in the subset of the nodes that is identified in the second segment set, the second segment set identified by the log data, and transmitting a third response identifying the third segment set.

8. A system comprising:

a non-transitory computer-readable medium storing a graph data structure and a change list, the graph data structure comprising (a) nodes representing computing devices and online entities and (b) edges between nodes representing relationships among the computing devices and the online entities;

processing hardware communicatively coupled to the non-transitory computer-readable medium and configured for performing operations comprising:

servicing a first query by performing a first search of nodes from the graph data structure, identifying a first segment of at least one first online entity and at least one first computing device selected as being linked, the first segment having a first set of traits, identifying a second segment of at least one second online entity and at least one second computing device selected as being linked, the second segment having a second set of traits, applying, based on the first segment and the second segment, a modification to the graph data structure, receiving a second query, identifying, from the change list, a subset of the nodes impacted by the modification to the graph data structure, and servicing the second query by performing a second search that is limited to the subset of the nodes defined by the first set of traits and the second set of traits.

9. The system of claim 8, wherein:

the graph data structure comprises:

(a) a first key-value index identifying the nodes of the graph data structure and traits of the nodes, wherein keys of the first key-value index identify the online entities and the computing devices, wherein values of the first key-value index identify the traits of the online entities and the traits of the computing devices, and (b) a second key-value index identifying edges connecting at least some of the nodes in the graph data structure, wherein keys of the second key-value index identify the computing devices and values of the second key-value index identify sets of the online entities linked to the computing devices; and performing the first search comprises:

identifying the first segment having the first set of traits by (a) selecting a first computing device and a first subset of the online entities identified in the second key-value index as being linked to the first computing device and (b) selecting, as the first set of traits, traits of the first computing device from the first key-value index and traits of the first subset of the online entities from the first key-value index, identifying the second segment having the second set of traits by (a) selecting a second computing device and a second subset of the online entities identified in the second key-value index as being linked to the second computing device and (b) selecting, as the second set of traits, traits of the second computing device from the first key-value index and traits of the second subset of the online entities from the first key-value index, determining that a set of query parameter values in the first query matches the first set of traits and the second set of traits, and including the first segment and the second segment in a first segment set for a response to the first query.

10. The system of claim 9, wherein performing the second search comprises:

determining that the first computing device is included in the impacted subset of nodes, identifying a modified first segment having a modified set of traits by (a) selecting the first computing device and a subset of the online entities identified in the second key-value index as being linked to the first computing device and (b) selecting, as the modified set of traits, traits of the first computing device from the first key-value index and traits of the subset of the online entities from the first key-value index, determining that the set of query parameter values does not match the modified set of traits, retrieving the second segment from a log or a database based on the second computing device being absent from the impacted subset of nodes, and creating a second segment set by excluding the first modified segment and retaining the second segment from the first segment set.

11. The system of claim 8, wherein:

the graph data structure comprises:

(a) a first key-value index identifying the nodes of the graph data structure and traits of the nodes, wherein keys of the first key-value index identify the computing devices and the online entities, wherein values of the first key-value index identify the traits of the computing devices and the traits of the online entities, and (b) a second key-value index identifying edges connecting at least some of the nodes in the graph data structure, wherein keys of the second key-value index identify the online entities and values of the second key-value index identify sets of the computing devices linked to the online entities; and performing the first search comprises:

identifying the first segment having the first set of traits by (a) selecting a first online entity and a first subset of the computing devices identified in the second key-value index as being linked to the first online entity and (b) selecting, as the first set of traits, traits of the first online entity from the first key-value index and traits of the first subset of the computing devices from the first key-value index, identifying the second segment having the second set of traits by (a) selecting a second online entity and a second subset of the computing devices identified in the second key-value index as being linked to the second online entity and (b) selecting, as the second set of traits, traits of the second online entity from the first key-value index and traits of the second subset of the computing devices from the first key-value index, determining that a set of query parameter values in the first query matches the first set of traits and the second set of traits, and including the first segment and the second segment in a first segment set for a response to the first query.

12. The system of claim 11, wherein performing the second search comprises:

determining that the first online entity is included in the impacted subset of nodes, identifying a modified first segment having a modified set of traits by (a) selecting the first online entity and a subset of the computing devices identified in the second key-value index as being linked to the first online entity and (b) selecting, as the modified set of traits, traits of the first online entity from the first key-value index and traits of the subset of the computing devices from the first key-value index, retrieving the second segment from a log or a database based on the second online entity being absent from the impacted subset of nodes, determining that the set of query parameter values does not match the modified set of traits, and creating a second segment set by excluding the first modified segment and retaining the second segment from the first segment set.

13. The system of claim 8, wherein a plurality of key-value indices that implement the graph data structure, wherein the operations further comprise:
applying a modification to one or more of the key-value indices that adds or removes an edge between a pair of the nodes in the graph data structure; and
updating the change list to identify the modification to the one or more of the key-value indices.

14. The system of claim 13, wherein the plurality of key-value indices comprises:
a first key-value index identifying the nodes of the graph data structure and traits of the nodes, wherein keys of the first key-value index identify the computing devices and the online entities, wherein values of the first key-value index identify the traits of the computing devices and the traits of the online entities;
a second key-value index identifying edges connecting at least some of the nodes in the graph data structure, wherein keys of the second key-value index identify the computing devices and values of the second key-value index identify sets of the online entities linked to the computing devices; and
a third key-value index identifying additional edges connecting at least some of the nodes in the graph data structure, wherein keys of the third key-value index identify the online entities and values of the third key-value index identify sets of the computing devices linked to the online entities.

15. The system of claim 14, wherein the processing hardware is configured to perform additional operations comprising:
applying an additional modification to the first key-value index by adding or removing a key-value pair;
updating the change list to identify the additional modification to the first key-value index;
receiving a third query subsequent to the additional modification to the first key-value index being applied; and
servicing the third query by at least:
retrieving, from a storage device, a segment set returned in response to the second query,
determining, from the change list, that the additional modification to the first key-value index has impacted traits in an additional subset of nodes identified in the segment set,
generating a modified segment set by at least updating the segment set based on the impacted traits in the additional subset of nodes.

16. A non-transitory computer-readable medium having program code stored thereon, wherein the program code is executable by one or more processing devices to perform operations comprising:
servicing a first query having a set of query parameter values with respect to traits of computing devices for accessing interactive computing environments and traits of online entities that are authenticated by the interactive computing environments, wherein servicing the first query comprises performing a first search of nodes from a graph data structure the first search of nodes further comprising;
identifying a first segment of at least one first online entity and at least one first computing device selected as being linked, the first segment having a first set of traits;
identifying a second segment of at least one second online entity and at least one second computing device selected as being linked, the second segment having a second set of traits;
determining that the set of query parameter values matches the first set of traits and the second set of traits; and
including the first segment and the second segment in a first segment set involving nodes of a graph data structure;
receiving a second query having the set of query parameter values;
a step for performing a second search of the graph data structure that is constrained by a change list for tracking changes to the graph data structure; and
responding to the second query with a second segment set generated by performing the second search.

17. The non-transitory computer-readable medium of claim 16, wherein:
the graph data structure comprises:
(a) a first key-value index identifying the nodes of the graph data structure and traits of the nodes, wherein keys of the first key-value index identify the online entities and the computing devices, wherein values of the first key-value index identify the traits of the online entities and the traits of the computing devices, and
(b) a second key-value index identifying edges connecting at least some of the nodes in the graph data structure, wherein keys of the second key-value index identify the computing devices and values of the second key-value index identify sets of the online entities linked to the computing devices; and
wherein, including the first segment and the second segment in the first segment set provides a response to the first query.

18. The non-transitory computer-readable medium of claim 17, wherein performing the second search comprises:
determining that the first computing device is included in a subset of nodes impacted by a modification to the graph data structure;
identifying a modified first segment having a modified set of traits by (a) selecting the first computing device and a subset of the online entities identified in the second key-value index as being linked to the first computing device and (b) selecting, as the modified set of traits, traits of the first computing device from the first key-value index and traits of the subset of the online entities from the first key-value index;
determining that the set of query parameter values does not match the modified set of traits;
retrieving the second segment from a log or a database based on the second computing device being absent from the impacted subset of nodes; and
creating the second segment set by excluding the first modified segment and retaining the second segment from the first segment set.

19. The non-transitory computer-readable medium of claim 16, wherein:
the graph data structure comprises:
(a) a first key-value index identifying the nodes of the graph data structure and traits of the nodes, wherein keys of the first key-value index identify the computing devices and the online entities, wherein values of the first key-value index identify the traits of the computing devices and the traits of the online entities, and (b) a second key-value index identifying edges connecting at least some of the nodes in the graph data structure, wherein keys of the second key-value index identify the online entities and values of the second key-value index identify sets of the computing devices linked to the online entities; and performing the first search comprises:
identifying a first segment having a first set of traits by (a) selecting a first online entity and a first subset of the computing devices identified in the second key-value index as being linked to the first online entity and (b) selecting, as the first set of traits, traits of the first online entity from the first key-value index and traits of the first subset of the computing devices from the first key-value index, identifying a second segment having a second set of traits by (a) selecting a second online entity and a second subset of the computing devices identified in the second key-value index as being linked to the second online entity and (b) selecting, as the second set of traits, traits of the second online entity from the first key-value index and traits of the second subset of the computing devices from the first key-value index, determining that the set of query parameter values matches the first set of traits and the second set of traits, and wherein, including the first segment and the second segment in the first segment set for provides a response to the first query.

20. The non-transitory computer-readable medium of claim 19, wherein performing the second search comprises:
determining that the first online entity is included in a subset of nodes impacted by a modification to the graph data structure;

identifying a modified first segment having a modified set of traits by (a) selecting the first online entity and a subset of the computing devices identified in the second key-value index as being linked to the first online entity and (b) selecting, as the modified set of traits, traits of the first online entity from the first key-value index and traits of the subset of the computing devices from the first key-value index;

retrieving the second segment from a log or a database based on the second online entity being absent from the impacted subset of nodes;

determining that the set of query parameter values does not match the modified set of traits; and creating the second segment set by excluding the first modified segment and retaining the second segment from the first segment set.

* * * * *